United States Patent [19]
Okado

[11] Patent Number: 4,827,151
[45] Date of Patent: May 2, 1989

[54] UNINTERRUPTIBLE POWER SUPPLY UTILIZING A SYNCHRONIZED CHOPPER FOR POWER FACTOR IMPROVEMENT

[75] Inventor: Chihiro Okado, Fuchu, Japan

[73] Assignee: Kabushiki Kaisha Toshiba, Kawasaki, Japan

[21] Appl. No.: 157,610

[22] Filed: Feb. 19, 1988

[30] Foreign Application Priority Data

Feb. 20, 1987 [JP] Japan .................. 62-35756
Mar. 30, 1987 [JP] Japan .................. 62-74261

[51] Int. Cl.$^4$ .............................................. H02J 7/00
[52] U.S. Cl. ........................................ 307/66; 320/59; 323/222; 363/37
[58] Field of Search ............... 307/66; 363/36, 37, 363/80, 89; 323/222; 320/57, 59

[56] References Cited

U.S. PATENT DOCUMENTS

| | | | |
|---|---|---|---|
| 4,672,300 | 6/1987 | Harper | 323/222 |
| 4,677,366 | 6/1987 | Wilkinson et al. | 323/222 |
| 4,688,162 | 8/1987 | Mutoh et al. | 323/222 |

FOREIGN PATENT DOCUMENTS

| | | | |
|---|---|---|---|
| 21522 | 2/1979 | Japan | 363/37 |
| 5779 | 1/1985 | Japan | 363/37 |
| 1057448 | 2/1967 | United Kingdom | 363/37 |

OTHER PUBLICATIONS

Electrical Society of Japan, 1986, p. 587; (considered only FIG. 1.)

Primary Examiner—William H. Beha, Jr.
Attorney, Agent, or Firm—Foley & Lardner, Schwartz, Jeffery, Schwaab, Mack, Blumenthal & Evans

[57] ABSTRACT

This invention relates to an uninterruptible power source equipment to rectify a commercial power supply to charge a capacitor through a chopper circuit to a constant voltage, thus to utilize it as a constant voltage power source and to charge a back-up capacitor, thus to deliver a power from the battery to the constant voltage power source when the commercial power source is interrupted. The output of the constant voltage power source may be converted to an a.c. output by the inverter unit. The chopper circuit includes a reactor and a switching element responding to a control signal to effect on-off operation. The control signal is formed as a sine wave signal in phase with the commercial power source. This control signal may be applied to the inverter unit. The UPS equipment allows a sine wave current having a power factor nearly equal to 1 to flow in when the commercial power source is in a normal condition, thereby making it possible to improve the power factor of the power source and to reduce power wave form distortion. In addition, when the commercial power source is in an abnormal condition, a current flowing out from the battery is allowed to become a flat direct current, thus making it possible to utilize the capacity of the battery to the maximum degree. Thus, an economical, small and light control apparatus for UPS can be realized.

4 Claims, 8 Drawing Sheets

UNINTERRUPTIBLE POWER SUPPLY UTILIZING A SYNCHRONIZED CHOPPER FOR POWER FACTOR IMPROVEMENT

BACKGROUND OF THE INVENTION

1. Field of the Art

This invention relates to an uninterruptible power source equipment installed for countermeasure of power interruption or failure of commercial power supplies.

2. Prior Art

According as small computers or OA equipment are popularized, UPSs (Uniterruptible Power Sources) of small capacity have been increasingly utilized.

An example of the circuit arrangement of a conventional UPS is shown in FIG. 11.

As seen from this figure, an a.c. power from a commercial power source 201 is converted to a d.c. power through a power factor improving reactor 202 and a diode bridge 203. The d.c. power thus converted is smoothed by a capacitor 204, resulting in a d.c. power source. When the commercial power source is interrupted, a d.c. power is delivered from a battery 205 through a diode 206.

The battery 205 is charged from a charger 207 when the commercial power source is in a normal state.

A capacitor 212 is charged from the commercial source through a step-up chopper composed of a reactor 208, a current detector 209, a FET 210 and a diode 211. The charging voltage thereof is controlled through a switching IC 229 and a drive circuit 230. In addition, the charging current thereof is detected by the current detector 209 and is fed back to the IC 229, whereby the current limiting operation is carried out.

The voltage across the capacitor 212 is converted to an a.c. voltage of the constant voltage and constant frequency through an inverter bridge 213 controlled by PWM (Pulse Width Modulation). The a.c. voltage thus obtained is outputted as an UPS voltage through a filter comprised of a capacitor 215.

The phase and voltage of the UPS outputted are controlled as follows.

Namely, a voltage phase of the commercial power source 201 is detected through a transformer 216, thus synchronizing the voltage phase detected with an output obtained by frequency-dividing an output of an oscillator 217 using a counter 219 through a synchronizing circuit 218 constituting the PLL circuit. Thus, a sine wave pattern memorized in a memory 220 is inputted to a D/A converter 221, thereby providing a sine wave voltage $v_{221}$ synchronous with the commercial power source.

The D/A converter 221 is of the multiplication type. An output voltage of the UPS is detected through a transformer 225. The voltage thus detected is converted to a d.c. voltage by a rectifier circuit 226 and is then compared with a voltage set value set by a voltage setter 227. A voltage $v_{228}$ obtained by amplifying an error therebetween using an amplifier 228 is inputted to the D/A converter 221. Thus, sine wave voltage reference $v_{221}$ is proportional to the voltage $v_{228}$ in magnitude synchronous with the commercial power source is Obtained as the output of the D/A converter 221.

The voltage reference $v_{221}$ is compared with an output $v_{222}$ of a triangular wave generator 222 at a comparator 223 to output a PWM signal $v_{223}$. The PWM signal $v_{223}$ thus outputted drives the FETs of the inverter bridge 213 through a drive circuit 224. Thus, an a.c. output proportional to the voltage reference $v_{221}$ is obtained.

With the above-mentioned conventional circuit, however, a problem exists in that since the a.c. power from the commercial power source is rectified by the rectifier circuit of the capacitor input type comprising the diode bridge 203 and the capacitor 204, the input waveform of the power source is deteriorated and thus the power factor is lowered, resulting in an increase in the input capacity. To prevent this, the reactor 202 is inserted, but if the value thereof is too large, the voltage of the d.c. power circuit is lowered, so that it is unable to be used.

For this reason, only a reactor to such an extent of no problem in practical use can be inserted. For example, for the output capacity of 1KVA of UPS, the input capacity from the commercial power source is increased to a value of about 2KVA.

To prevent this, there is employed a method to apply PWM control the FET 210 using a sine wave to change the input current of the commercial power source to a sine wave current. However, since the control of the charge and discharge circuit for the battery 205 and/or the method of forming the current reference of the sine wave becomes complicated in the UPS, such a method is of question from an economical point of view.

SUMMARY OF THE INVENTION

An object of this invention is to provide an UPS equipment having a high power factor by solving the above-mentioned tasks.

In accordance with this invention, there is provided a reasonably operable control equipment for UPS adapted such that the input current from the commercial power source is caused to have a power factor of substantially 1 using a sine wave, that a less ripple current flows through the capacitor provided on the side of the d.c. side of the d.c.-to-a.c. converter or the battery, and that the back-up time can be prolonged by utilizing the capacity of the battery to the maximum degree when the commercial power source is interrupted.

DETAILED DESCRIPTION OF PREFERRED EMBODIMENTS

Figure 1:
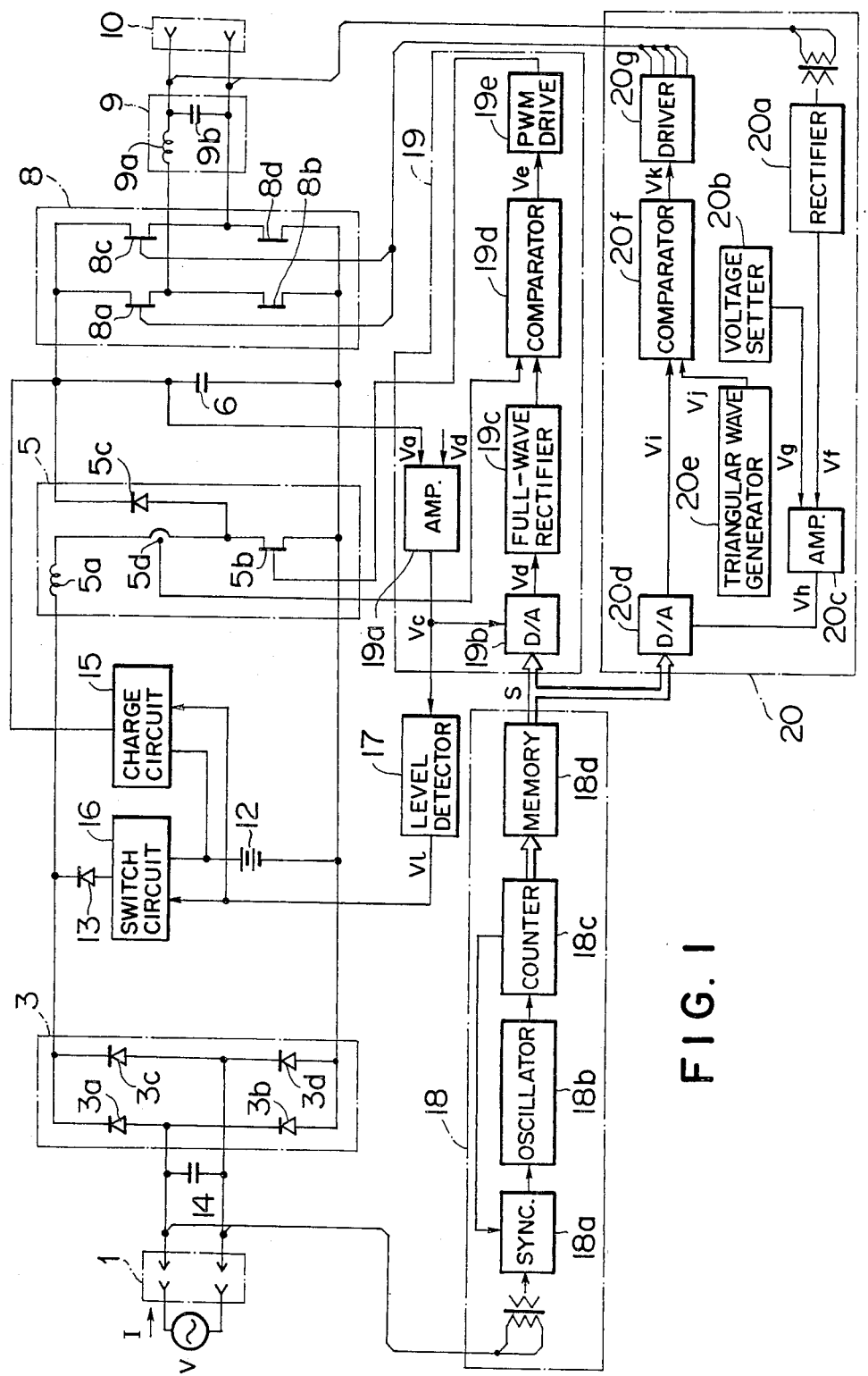
FIG. 1 is a block diagram showing an embodiment of an uninterruptible power source equipment according to this invention.

FIG. 1 is a block diagram showing an embodiment of an UPS equipment according to this embodiment. In this figure, on the input side of the commercial power source of a diode bridge 3, a capacitor 14 for eliminating higher harmonic components in the input current I is connected in parallel.

Figure 11:
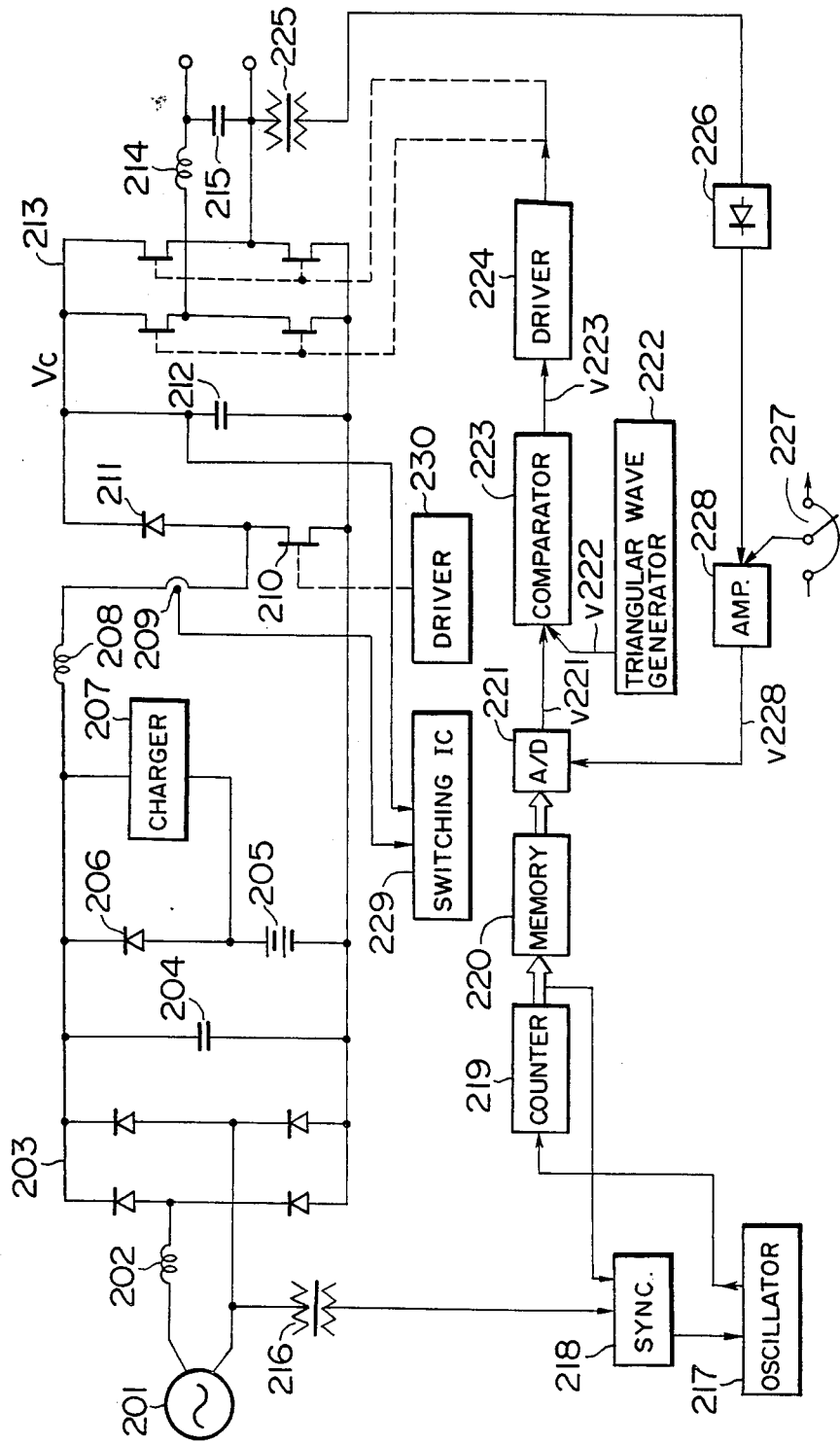
FIG. 11 is a circuit diagram showing an example of the control equipment for a conventional UPS.

The arrangement shown in FIG. 1 is the same as that in FIG. 11 in that the diode bridge 3 is connected on the output side thereof to the input of a step-up chopper circuit 5, that the output of the step-up chopper circuit is connected to a capacitor 6 and to the input of an inverter circuit 8, and that the output of the inverter circuit 8 is connected to an outlet or receptacle 10 through a filter 9.

In this embodiment, a series circuit comprising a battery 12, a switch circuit 16 using an SSR (Solid State Relay), and a diode 13 is connected in parallel with the diode bridge 3. Further, a charge circuit 15 is connected between the plus side output terminal of the step-up chopper circuit 5 and the battery 12. In addition, a level detector 17 which discriminates between the normal condition of the commercial power source and the abnormal condition thereof is connected commonly to the charge circuit 15 and the switch circuit 16.

On the input side of the commercial power source, a power synchronizing circuit 18 which outputs a sine wave in phase with the commercial power source in the form of a digital signal is connected. The output of the power synchronizing circuit 18 is applied to a step-up chopper control circuit 19 and to an inverter control circuit 20.

The power synchronizing circuit 18 is composed of a PLL circuit, a memory 18d for storing data corresponding to the sine waveform, and the like wherein the PLL circuit comprises a power synchronizing circuit 18a for making a comparison between the zero-cross time of an a.c. voltage input and the zero-cross time of a digital signal to detect a phase difference therebetween, an oscillation circuit 18b for producing a pulse signal corresponding to the proportion and integral values of the above-mentioned phase difference, and a counter 18c for counting the pulse signal.

The step-up chopper control circuit 19 is composed of an amplifier circuit 19a, a digital-to-analog (D/A) converter circuit 19b, a full-wave rectifier circuit 19c, a comparator 19d, and a PWM drive circuit 19e for allowing the FET 5b to be subjected to switching.

The inverter control circuit 20 is composed of a rectifier circuit 20a a voltage setting circuit 20b for setting an a.c. output voltage (second reference voltage), an amplifier circuit 20c, a digital-to-analog (D/A) converter 20d, a triangular wave generator circuit 20e a comparator circuit 20f, a drive circuit 20g for allowing the comparator circuit 20f and FETs 8a to 8d to effect switching operation, and the like.

The UPS equipment in this embodiment is constituted as stated above. An input voltage V serving as a commercial power supply voltage is inputted to the synchronizing circuit 18a through the transformer. Thus, a count signal of 0 up to a fixed value is outputted from the counter 18c every period of the input voltage V. Responding to the count signal, digital data corresponding to the sinusoidal waveform are sequentially read out and outputted from the memory 18d. Namely, the synchronous sine wave signal S synchronous with the phase of the input voltage V is outputted from the memory 18d.

Figure 2:
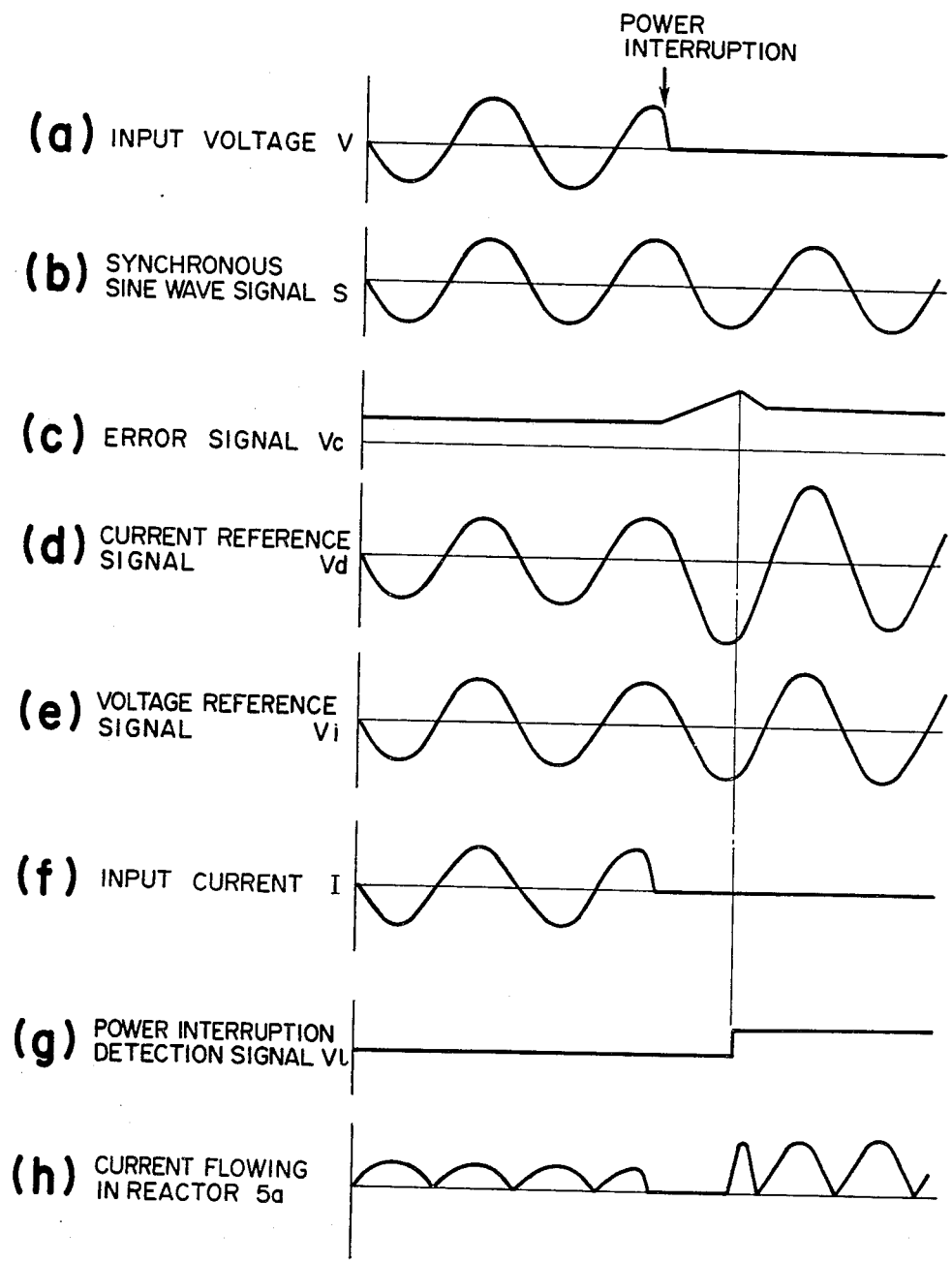
FIGS. 2(a) to 2(h) are waveform diagrams of signals on respective components of the equipment shown in FIG. 1.

The amplifier circuit 19a of the step-up chopper control circuit 19 amplifies an error voltage indicative of the difference between a voltage Va across the capacitor 6 and a set voltage (first reference voltage) Vb set in advance to output an error signal Vc as shown in FIG. 2(c). The D/A converter 19b outputs an analog signal indicative of the multiplied value or product of the error signal Vc and the above-mentioned synchronous sine wave signal S as a current reference signal Vd as shown in FIG. 2(d). The full-wave rectifier circuit 19c applies full-wave rectification to the current reference signal Vd to output a full-wave rectified signal. The comparator circuit 19d inputs the full-wave rectified current reference signal Vd and a current signal flowing in the reactor 5a detected by the current detector 5d to output an error signal indicative of the difference therebetween. The PWM drive circuit 19e effects on-off operation of the FET 5b in accordance with a pulse signal having a duty ratio corresponding to the value of the error signal Ve.

Thus, the d.c. voltage rectified by the diode bridge 3 is stepped up by the step-up chopper circuit 5, whereby a second d.c. voltage is obtained across the capacitor 6. In this case, since the duty ratio of the pulse signal for allowing the FET 5b to effect on-off operation is changed in accordance with the level of the synchronous sine wave signal S, the PWM modulation is carried out in synchronism with the input voltage V and the above duty is controlled in accordance with the voltage Va across the capacitor 6. Thus, the voltage Va is adjusted so that it is equal to the set voltage Vb.

On the other hand, the rectifier circuit 20a of the inverter control circuit 20 inputs and rectifies the a.c. output voltage of the UPS equipment through the transformer to detect the output voltage level Vf.

The amplifier circuit 20c amplifies an error between the output voltage level Vf and the voltage Vg set at the voltage setting circuit 20b to output an error signal Vh. The D/A converter circuit 20d outputs an analog signal indicative of the multiplied value or product of the synchronous sine wave signal S and the error signal Vh as a voltage reference signal Vi as shown in FIG. 2(e).

The triangular wave generator circuit 20e outputs a triangular wave signal Vj having a fixed frequency, such as, for example, 10 KHz which is sufficiently larger than the frequency of the input voltage V. The comparator circuit 20f makes a comparison between the voltage reference signal Vi and the triangular wave signal Vj to thereby output a PWM signal Vk. Responding to this PWM signal Vk, the drive circuit 20g allows the FETs 8a to 8d to effect on-off operation. Thus, the d.c. voltage Va across the capacitor 6 is further converted to an a.c. voltage by the inverter circuit 8. The a.c. voltage thus obtained passes through the filter circuit 9 so that higher harmonic components thereof are removed by the filter circuit 9, and is then outputted to the outlet 10. In this case, since the inverter control circuit 20 effects PWM control of the inverter circuit 8 in synchronism with the synchronous sine wave signal S, the a.c. output voltage becomes in phase with the input voltage V. In addition, since the set output voltage Vg is ordinarily set so that the a.c. output voltage is constant, a constant a.c. output voltage is taken out.

To the outlet 10, equipment such as a computer are connected. Such equipment can be used by the above-mentioned a.c. output voltage in the same manner as in the case that the commercial power source is used.

In the circuit shown in FIG. 1, the smoothing capacitor 4 provided in the conventional circuit shown in FIG. 11 is eliminated. In addition, in this circuit, the step-up chopper control circuit 19 controls the step-up chopper circuit 5 in synchronism with the synchronous sine wave signal S in phase with the input voltage V and the inverter control circuit 20 also controls the inverter circuit 8 in synchronism with the synchronous sine wave signal S.

Thus, as shown in FIG. 2(f), the input current I from the commercial power source substantially becomes equal to the input voltage V in waveform and becomes in phase with the latter. Accordingly, the power factor of the UPS equipment becomes nearly equal to 1, with the result that the power factor is greatly improved as compared to the conventional example shown in FIG. 11.

Under the condition where the commercial power source is normal, the charge circuit 15 is being operated and the output voltage of the step-up chopper circuit 5 is delivered also to the battery 12 through the charge circuit 15, whereby the battery 12 is being charged.

In such a condition, if the commercial power source is interrupted and thus the input voltage V becomes zero as shown in FIG. 2(a), the input of the step-up chopper circuit 5 also becomes zero, so that the charging operation of the capacitor 6 is also stopped. Thus, since the voltage Va across the capacitor 6 gradually lowers due to the discharge of the capacitor 6, the error signal Vc outputted from the amplifier circuit 19a rises as shown in FIG. 2(c). When the error signal Vc exceeds a predetermined level, the level detector circuit 17 outputs a power interruption detection signal V1 of "H" level as shown in FIG. 2(g). When the charge circuit 15 receives this power interruption detection signal V1, it stops the charging operation of the battery 12. In addition, when the switch circuit 16 receives the power interruption detection signal V1, it closes the internal switch circuit. Thus, the d.c. voltage of the battery 12 is inputted to the step-up chopper circuit 5 through the diode 13, so that the step-up chopper circuit 5 raises the voltage of the battery 12 to charge the capacitor 6.

Thus, the voltage Va across the capacitor 6 is restored to the original value. However, setting is made such that the voltage of the battery 12 is slightly lower than the d.c. voltage obtained by rectifying the input voltage V using the diode bridge 3. Fr this reason, the voltage Va which is stepped up by the step-up chopper circuit 5 and is then outputted to the capacitor 6 becomes slightly smaller than that before power interruption. Thus, the error voltage Vc slightly rises as shown in FIG. 2(c).

On the other hand, when the commercial power source is interrupted, the power synchronizing circuit 18 continuously outputs the synchronous sine wave signal S as shown in FIG. 2(b) (because this function is known in the art, its explanation will be omitted). The step-up chopper control circuit 19 controls the step-up chopper circuit 5 in synchronism with the synchronous sine wave signal S in the same manner as stated above. It is to be noted that since the error signal Vc outputted from the amplifier circuit 19a at this time is slightly larger than that before power interruption, the level of the current reference signal Vd becomes large as shown in FIG. 2(d). Thus, a current corresponding to that level will flow in the reactor 5a as shown in FIG. 2(h).

Further, the inverter control circuit 20 controls the inverter circuit 8 in synchronism with the synchronous sine wave signal S in the same manner as stated above. Thus, the d.c. voltage across the capacitor 6 is converted to the same a.c. voltage as that before power interruption and is continuously delivered without momentary interruption. It is to be noted that the voltage Va across the capacitor 6 is lower than that before power interruption at this time as previously described, but since the output voltage level Vf is controlled so as to become equal to the set output voltage Vg, it is maintained at a fixed value.

Assuming now that the power interruption is restored, a d.c. voltage from the diode bridge 3 is established again. Since this d.c. voltage is slightly larger than the voltage of the battery 12, the output voltage Va of the step-up chopper circuit 5 also rises somewhat. Thus, the error signal Vc outputted from the amplifier circuit 19a lowers, so that the level detector circuit 17 outputs a power interruption detection signal V1 of "L" level. When the power interruption detection signal V1 shifts to "L" level, the switch circuit 16 is closed at the time when a current flowing into the diode 13 has become zero. In addition, when the power interruption signal V1 shifts to "L" level, the charge circuit 15 initiates charging operation of the battery 12 and is restored to the steady state operation.

Also in case where a voltage is lowered to a predetermined level due to any abnormal condition except that the commercial power source is interrupted, such a voltage drop is detected by the level detector 17, whereby the same operation as stated above will be performed.

As just described above, in this embodiment, the smoothing capacitor on the output side of the diode bridge 3 is eliminated, and the synchronous sine wave signal S synchronous with the input voltage V of the commercial power source is prepared, thus to operate the step-up chopper circuit 5 and the inverter circuit 8 in synchronism with the synchronous sine wave signal and to effect PWM control on the basis of the signal waveform thereof. Thus, the waveform of the input current I approximates to the waveform of the input voltage V, so that the power factor of the UPS equipment becomes nearly equal to 1. Accordingly, the input current from the commercial power source to the UPS equipment becomes nearly equal to the output current from the UPS equipment to various equipment, thus eliminating the necessity of particularly increasing the capacity of a power distributing equipment of the commercial power source or the outlet.

Since the charge circuit 15 stops the charging operation of the battery 12 when the commercial power source is interrupted, a power loss as in the case that the battery 12 is charged again by the stepped-up d.c. voltage is eliminated, resulting in an increased use efficiency of power. In the switch circuit 16, SSRs using TRIAC are used for the switching elements. SSRs capable of turning the circuit on and off using a control signal of TTL level (0, +5V) are on the market at a low cost. Ordinarily, it is required to constitute a complicated firing circuit using a pulse transformer, etc. in order to control the TRIAC, but SSR is used, thereby making it possible to readily constitute a switch circuit closed only when power is interrupted.

Figure 3:
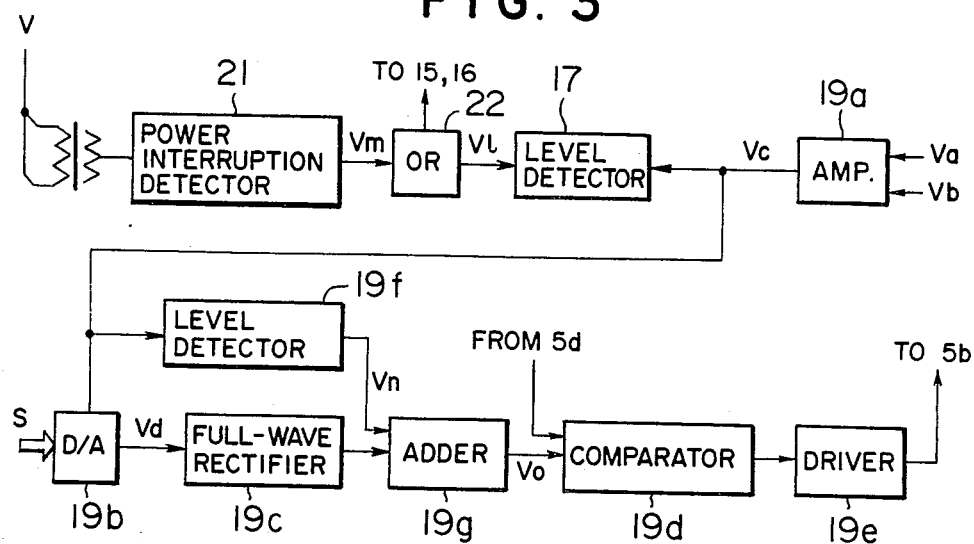
FIG. 3 is a block diagram showing the portions different from those in FIG. 1 in another embodiment of this invention.

FIG. 3 shows another embodiment of UPS equipment according to this invention. The equipment shown in this figure has an arrangement such that a power interruption detector circuit 21 for detecting a voltage drop of the commercial power source and the power interruption thereof to output a power interruption detection signal Vm when the power source is in an abnormal condition, and an OR circuit 22 for inputting the power interruption detection signal Vm and the power interruption detection signal V1 from the level detector 17 are provided, thus to control the switch circuit 16 and the charge circuit by the output of the OR circuit 22. In accordance with this arrangement, the abnormal condition of the commercial power source can be quickly detected by the power interruption detector circuit 20. In addition, in case where a d.c. voltage is difficult or unable to obtain due to the trouble of the diode bridge 3 or the like, such an abnormal condition can be detected by the level detector circuit 17, thus making it possible to effect a d.c. power supply from the battery 12 in the same manner as stated in the above-mentioned embodiment.

Figure 4:
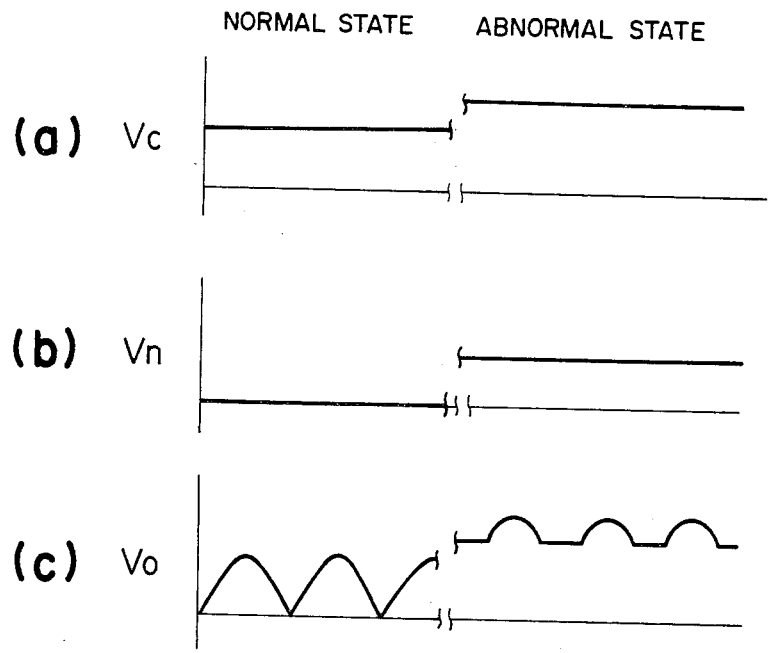
FIGS. 4(a) to 4(c) are signal waveform diagrams of the operation of the equipment in FIG. 3.

Furthermore, as having been explained with reference to FIG. 2(c), the error signal Vc which is the output of the amplifier 19a becomes larger in an abnormal condition of the commercial power source than in a normal condition thereof as shown in FIG. 4(a). In the arrangement shown in FIG. 3, a level detector circuit 19f operative to input this error signal Vc, thus to output a signal Vn shifting to a specific level in an abnormal condition of the commercial power source is provided. In addition, an adder circuit 19g operative to add the signal Vn and a current reference signal outputted from the full-wave rectifier circuit 19c, thus to output a current reference signal Vo as shown in FIG. 4(c) is provided to thereby input the current reference signal Vo to the comparator 19d.

In accordance with this arrangement, since a current flowing in the switch circuit 16 is not equal to zero in an abnormal condition of the commercial power source, once the TRIAC incorporated in the switch circuit 16 is turned on, it continues its on state until the abnormal condition of the power source is restored, resulting in the stabilized operation. In addition, when power is supplied from the battery 12, such a system in which no a.c. component is included in a current taken out provides higher efficiency.

Figure 5:
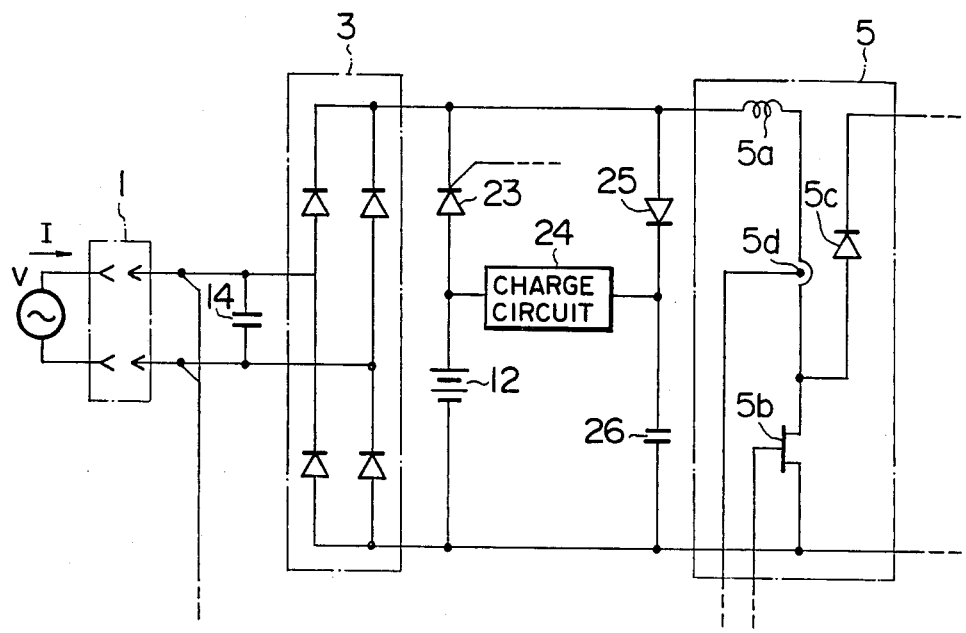
FIG. 5 is a block diagram showing the portions different from those in FIG. 1 in a further embodiment of this invention.

Further, a thyristor 23 may be used as shown in FIG. 5 instead of the switch circuit 16 and the diode 13 to thereby open and close the discharge circuit in the same manner as stated above. In addition, as shown in FIG. 5, a charge circuit 24 may be connected through a diode 25 from the output side of the diode bridge 3 to provide a capacitor 26 at the junction thereof. Thus, since a current flows from the diode 25 into the charge circuit 24 only when the commercial power source is in a normal state, the necessity of effecting on-off control of the charge circuit, which has been required in the circuit arrangement shown in FIG. 1, is eliminated.

Figure 6:
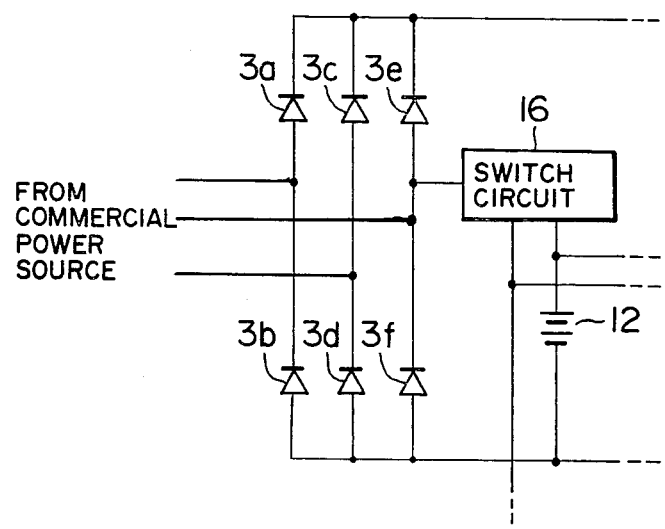
FIG. 6 is a block diagram showing the portions different from those in FIG. 1 in a still further embodiment of this invention.

Furthermore, there may be employed an arrangement such that a three-phase diode bridge comprising diodes 3a to 3f as shown in FIG. 6 is used for the diode bridge 3 to connect the d.c. output from the switch circuit 16 to one of three-phase input terminals.

It is to be noted that the reactor 5a of the step-up chopper circuit 5 is required to have a high inductance when an input d.c. voltage is high, and that while the above-mentioned reactor is sufficient to have a small inductance when such an input d.c. voltage is low, it is required to have a large current capacity. Accordingly, in the case where the voltage of the battery 12 is greatly smaller than the d.c. voltage output from the diode bridge 3, the reactor 5a is required to have high inductance and large current capacity, with the result that it becomes large-sized. In such a case, another reactor may be provided on the input side of the commercial power source to lower the d.c. voltage output from the diode bridge 3. Thus, the inductance of the reactor 5a can be reduced, so that a small sized reactor may be used.

Figure 7:
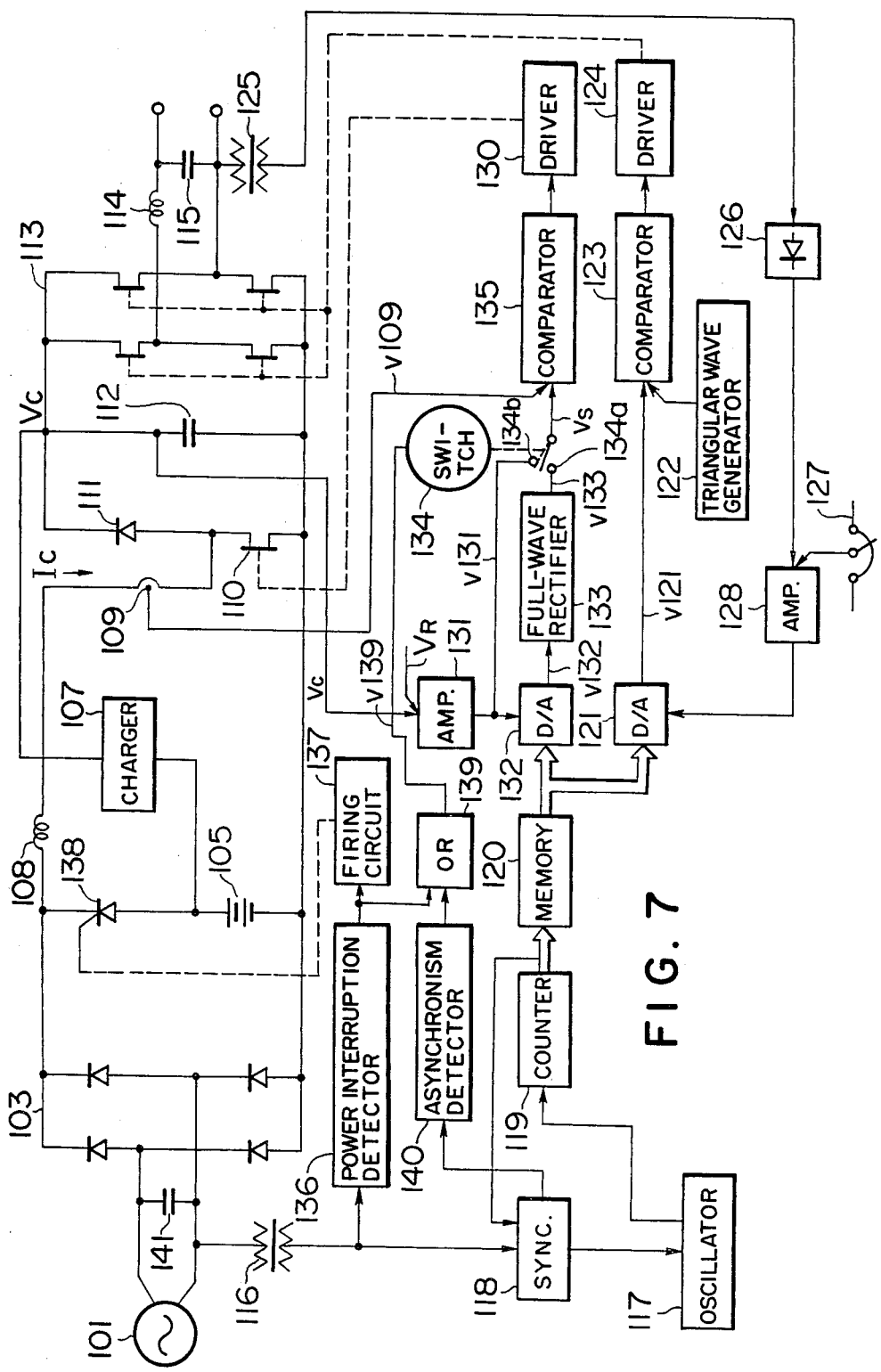
FIG. 7 is a circuit diagram showing a still more further embodiment of this invention.

FIG. 7 shows a still further embodiment of this invention. In this arrangement, a capacitor 141 for filter and a diode bridge 103 are connected to a commercial power source 101, and a step-up chopper comprising a reactor 108 and a FET 110 is connected on the d.c. side of the diode bridge 103 to thereby charge a capacitor 112 by the d.c. output thereof.

In this embodiment, an error between a voltage reference of the chopper output and a chopper output voltage Vc is amplified by an amplifier 131. The error voltage thus amplified serves as an analog input of a D/A converter 132 of the multiplication type connected in parallel with a D/A converter 121 for the inverter voltage reference. An output $v_{132}$ of the D/A converter 132 is converted to a voltage $v_{133}$ through a full-wave rectifier circuit 133. The voltage $v_{133}$ thus obtained is inputted to a comparator 135 as a chopper current reference $v_s$ via an a contact 134a of a switch 134.

On the other hand, an output $v_{131}$ of the amplifier 131 serves as the chopper current reference $v_s$ via a b contact of the switch 134.

The above-mentioned current reference $v_s$ and a chopper current signal $v_{109}$ detected by a current detector 109 are compared with each other at a comparator 135 having a hysteresis. The output of the comparator 135 effects on-off operation of the FET 110 for chopper through a drive circuit 130.

The positive side of the battery 105 is connected to the positive side of a diode bridge 103 through a thyristor 138. When power interruption of the commercial power source is detected by a power interruption detector 136, the thyristor 138 is turned on by a firing circuit 137 to thereby connect the battery 105 as the power supply of the chopper circuit.

The power interruption detection signal cuts the switch 134 off through an OR circuit 139 to close the b contact 134b. On the other hand, an asynchronism or asynchronization detector 140 detects asynchronization shift with respect to the power source of a synchronizing circuit 118 to cut the switch 134 off through the OR circuit 139, thus to close the b contact 134b.

By producing a sine wave synchronized with the commercial power source by the synchronizing circuit 118 and an oscillator 117 to count it using a counter 119 to further input the count value to the D/A converter 121 of the multiplication type through a memory 120, an inverter output voltage reference $v_{121}$ is obtained as the output of the D/A converter 121.

The above-mentioned voltage reference $v_{121}$ is changed by varying the sine wave with an output obtained by amplifying an error of the inverter output voltage with respect to the set value of a voltage setter 127 being as an analog input of the D/A converter 121 of the multiplication type.

The output voltage of the inverter can be controlled by making a comparison between the voltage reference $v_{121}$ and a triangular wave output from a triangular wave generator 122 at a comparator 123 to apply PWM control to the inverter bridge 113 using a well known circuit.

On the other hand, the step-up chopper comprising the reactor 108, the FET 110, the diode 111 and a capacitor 112 supplies a d.c. power to the inverter bridge 113. Thus, the voltage Vc across the capacitor 112 serving as an output voltage is controlled so that it is maintained substantially constant.

Namely, an error of the capacitor voltage Vc with respect to the chopper output voltage reference $V_R$ is amplified by the amplifier 131. The output $v_{131}$ of the amplifier 131 serves as an analog input of the D/A converter 132 of the multiplication type. Thus, an output $v_{132}$ in phase with the output $v_{121}$ of the D/A converter 121 (therefore, also in phase with the commercial power source) to which the same input as the digital input of the D/A converter 132 is parallelly inputted and proportional to the output $v_{131}$ in magnitude is outputted from the D/A converter 132. This output signal $v_{132}$ is rectified by a full-wave rectifier circuit 133. When the commercial power source 101 is in a normal state, the output $v_{133}$ of the full-wave rectifier circuit 133 serves as the current reference $v_s$ via the contact 134a and is compared with an output $v_{109}$ of the current detector 109 at a comparator 135. The output of the comparator 135 constitutes a current minor loop to drive the FET 110 as a PWM signal, thus to control the chopper current Ic in proportion to the current reference $v_s$.

Figure 8:
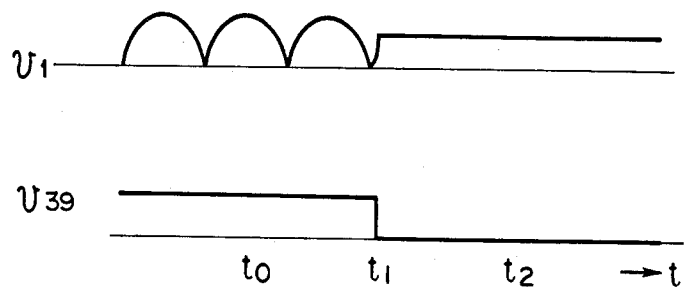
FIGS. 8 and 9 are a waveform diagram and a characteristic view for explanation of the operation of the equipment in FIG. 7, respectively.

The period of $t_0$ to $t_1$ in FIG. 8 is the period during which the commercial power source is in a normal state. The current reference $v_s$ has a full-wave rectified waveform of the sine wave. In the input current to the chopper circuit, higher harmonics are included. Such higher harmonic components are absorbed by a capacitor 141.

If the commercial power source 101 is interrupted at the time of $t_1$, the power interruption detector 136 detects this interruption to turn the thyristor 138 on. Thus, power is delivered from the battery 105 to the chopper circuit and, at the same time, the switch 134 becomes operative through the OR circuit 139, so that the contact 134b is closed. Thus, the current reference $v_s$ is switched to a smoothed value, so that the current from the battery 105 becomes a flat direct current.

Further, if the frequency of the commercial power source becomes abnormal, so that the commercial power source and the invertor are asynchronous, the asynchronism detector 140 detects this asynchronism to switch the switch 134 through the OR circuit 139 so that the contact 134b is closed. Thus, a control is effected such that the current from the commercial power source 101 has a rectangular waveform, with the result that no beat would occur in a current flowing in from the commercial power source 101.

Figure 9:
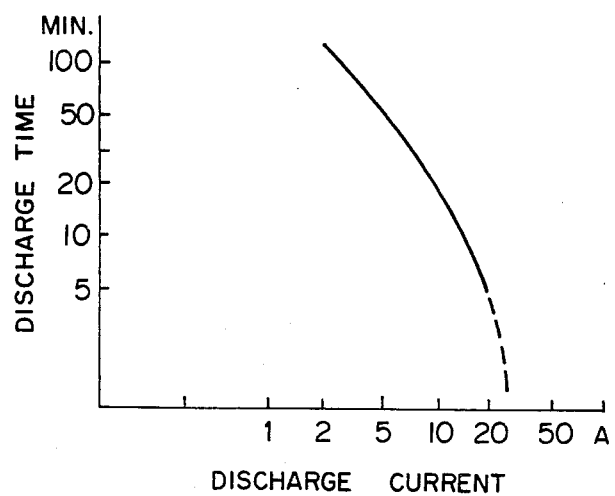

An example of the charge characteristic of the battery used in the UPS is shown in FIG. 9. In most cases, the back up time for the UPS is five to ten minutes. There is a tendency that the discharging time rapidly falls with respect to the discharging current in the vicinity of such a back up time.

This results from the fact that when the discharging current has increased, the chemical reaction cannot sufficiently proceed accordingly and the fact that the loss due to the internal resistor is increased. Before and after the discharging time of ten minutes, a characteristic is obtained such that the discharging time is inversely proportional to the square of the discharging current. Where a full-wave rectified current and a flat current are discharged from the battery as shown in FIG. 8, since the available or utilizable power is proportional to the mean of the current and the discharging current is inversely proportional to the square of the effective value of the current, assuming that the battery voltage is constant, the effective value at the period of $t_1$ to $t_2$ when the mean value between $t_0$ and $t_1$ and that between $t_1$ and $t_2$ are assumed to be the same is nearly 0.9 times larger than at the period of $t_0$ to $t_1$, so that the discharging time is increased by about 20%. Thus, the battery can be utilized with high efficiency.

Figure 10:
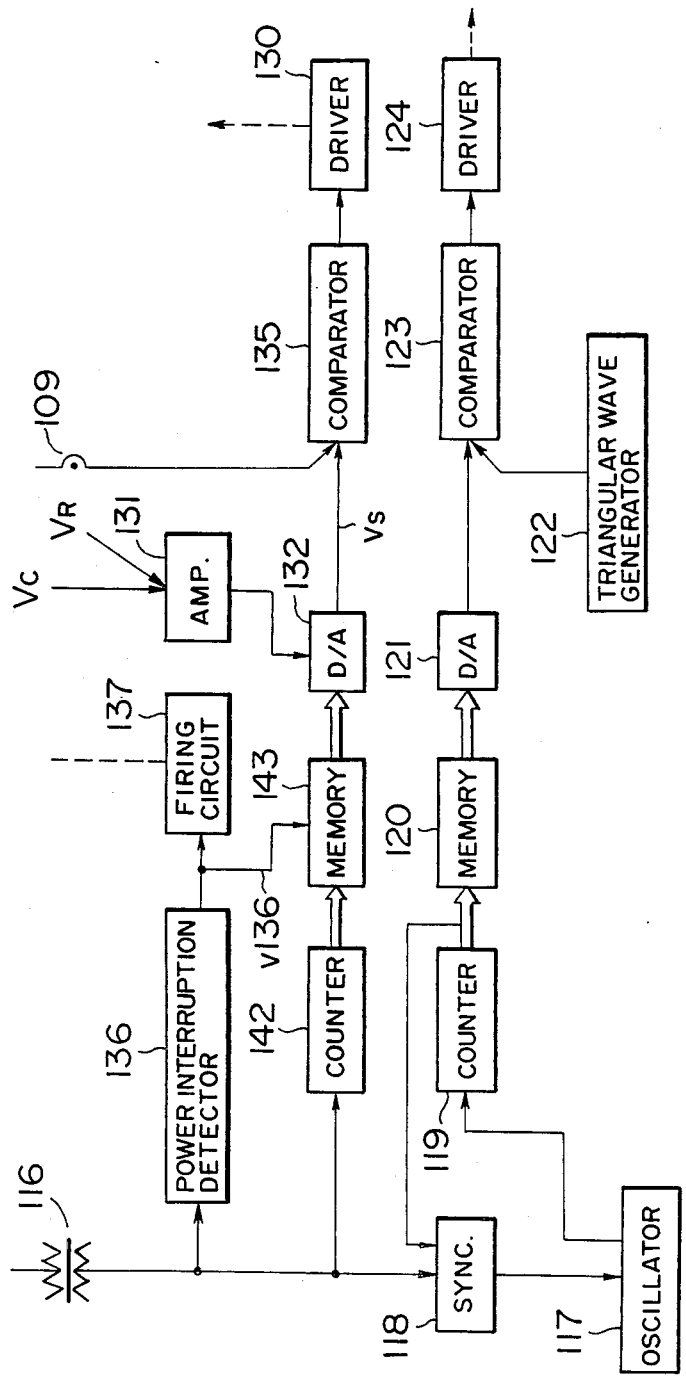
FIG. 10 is a circuit diagram showing a further different embodiment of this invention.

A further different embodiment of this invention is shown in FIG. 10 wherein the same portions of the main circuit as those in FIG. 7 are omitted.

In the embodiment shown in FIG. 7, there is adopted a scheme such that the current reference $v_s$ of the chopper circuit is in phase with the inverter output voltage reference $v_{221}$ and synchronism between the commercial power source and the inverter frequency is not maintained in order to ensure the inverter frequency when the power supply frequency becomes abnormal. In the embodiment shown in FIG. 10, a counter 142 synchronous with the commercial power source is provided in order that a current flowing in from the commercial power source has a sinusoidal waveform. In addition, full-wave rectified wave forms of the sine wave are memorized in a memory 143 operative in response to the output of the counter 142 to output a full-wave rectified waveform through the D/A converter 132. Thus, the full-wave rectifier circuit 133 in FIG. 7 is omitted.

When the commercial power source 101 is interrupted, the power interruption detector 136 detects such an interruption to switch the content of the memory 143 from the full-wave rectified waveforms to corresponding fixed values Thus, the switch 134 in FIG. 7 is omitted.

It is to be noted that since the waveform of the input current from the commercial power source is sinusoidal even when the commercial power source frequency is in an abnormal condition in the embodiment in FIG. 10, such an implementation may be utilized as a frequency converter.

It is further to be noted that this invention is applicable to the UPS of the d.c. type in which the inverter unit in FIG. 1 or 7 is not provided.

As described in detail, the UPS equipment according to this invention allows a sine wave current having a power factor nearly equal to 1 to flow in when the commercial power source is in a normal condition, thereby making it possible to improve the power factor of the power source and to reduce power waveform distortion. In addition, when the commercial power source is in an abnormal condition, a current flowing out from the battery is allowed to become a flat direct current, thus making it possible to utilize the capacity of the battery to the maximum degree. Thus, an economical, small and light control apparatus for UPS can be realized.

What is claimed is:

1. An uninterruptible power source equipment comprising:

a rectifier circuit for rectifying a power from a commercial power source to obtain a d.c. voltage;

a battery for delivering a d.c. voltage when said power source is in an abnormal state;

a chopper circuit including a reactor and a switching element to convert said d.c. voltage to a second d.c. voltage;

a power synchronizing circuit for generating a sine wave signal in phase with said power from said commercial power source;

a copper control circuit for carrying out on-off control of said switching element is said chopper circuit in synchronism with said sine wave signal;

an inverter circuit including a plurality of switching elements which are bridge-connected to convert said second d.c. voltage to an a.c. voltage having the same frequency as that of said commercial power source; and an inverter control circuit for carrying out on-off control of said respective switching elements in synchronism with said sine wave signal, wherein said chopper control circuit comprises:

first error detector means for detecting an error between an output of said chopper circuit and a first reference voltage set in advance;

a first multiplier circuit for inputting said error and said sine wave signal to output a current reference signal indicative of the product of said error and said sine wave signal; and a first drive circuit for carrying out on-off control of said switching element in said chopper circuit in accordance with said current reference signal; and wherein said inverter control circuit comprises second error detector means for detecting an error between said a.c. voltage a said second reference voltage, a second multiplier circuit for inputting said error and said sine wave signal to output a voltage reference signal, and a second drive circuit for carrying out on-off control of said switching elements in said inverter circuit in accordance with said voltage reference signal.

2. An uninterruptible power source equipment as set forth in claim 1, wherein the charging operation of said battery is carried out by said second d.c. voltage.

3. An uninterruptible power source equipment as set forth in claim 1, which further comprises a charge circuit for charging said battery only when said second d.c. voltage is above a predetermined voltage, and a switch circuit for delivering a d.c. voltage from said battery when said commercial power source is in an abnormal state.

4. An uninterruptible power source equipment comprising:

a rectifier circuit for rectifying a power from a commercial power source to obtain a d.c. voltage;

a battery for delivering a d.c. voltage when said power source is in an abnormal state;

a chopper circuit including a reactor and a switching element to convert said d.c. voltage to a second d.c. voltage;

a power synchronizing circuit for generating a sine wave signal in phase with said power from said commercial power source; and a chopper control circuit for carrying out on-off control of said switching element in said chopper circuit in synchronism with said sine wave signal, wherein said chopper control circuit comprises a current reference circuit forming a first current reference for allowing an input current to said chopper circuit to be a sine wave current synchronous with said power from said commercial power source and having a power factor nearly equal to 1, and for forming a second current reference switch circuit for outputting said first current reference to said chopper control circuit when power is supplied from said commercial power source, and for outputting said second current reference to said chopper control circuit when power is supplied from said battery.

* * * * *